(12) United States Patent
Lee et al.

(10) Patent No.: US 12,549,935 B2
(45) Date of Patent: Feb. 10, 2026

(54) METHOD AND DEVICE FOR PROVIDING DIRECT COMMUNICATION IN WIRELESS COMMUNICATION SYSTEM

(71) Applicant: Samsung Electronics Co., Ltd., Suwon-si (KR)

(72) Inventors: Hoyeon Lee, Suwon-si (KR); Sunghoon Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 987 days.

(21) Appl. No.: 17/764,302

(22) PCT Filed: Sep. 25, 2020

(86) PCT No.: PCT/KR2020/013079
§ 371 (c)(1),
(2) Date: Mar. 28, 2022

(87) PCT Pub. No.: WO2021/060918
PCT Pub. Date: Apr. 1, 2021

(65) Prior Publication Data
US 2022/0369092 A1 Nov. 17, 2022

(30) Foreign Application Priority Data

Sep. 27, 2019 (KR) .................. 10-2019-0120130

(51) Int. Cl.
*H04W 8/08* (2009.01)
*H04W 4/50* (2018.01)
(Continued)

(52) U.S. Cl.
CPC ............. *H04W 8/082* (2013.01); *H04W 4/50* (2018.02); *H04W 8/005* (2013.01); *H04W 8/20* (2013.01); *H04W 76/14* (2018.02)

(58) Field of Classification Search
CPC ....... H04W 8/082; H04W 8/005; H04W 8/20; H04W 76/14; H04W 4/50
(Continued)

(56) References Cited

U.S. PATENT DOCUMENTS 11,197,296 B2* 12/2021 Faurie .................. H04W 72/23
2016/0029423 A1 1/2016 Ke et al.
(Continued)

FOREIGN PATENT DOCUMENTS

KR 10-2016-0013005 A 2/2016
KR 10-2017-0036767 A 4/2017
(Continued)

OTHER PUBLICATIONS

Korean Office Action dated Feb. 22, 2024, issued in Korean Patent Application No. 10-2019-0120130.
(Continued)

*Primary Examiner* — Chi Tang P Cheng
(74) *Attorney, Agent, or Firm* — Jefferson IP Law, LLP

(57) ABSTRACT

According to an embodiment of the disclosure, an operating method of a first proximity-based services (ProSe) function belonging to a first public land mobile network (PLMN) includes: receiving a first ProSe Communication Create Request message from an application function (AF), a network exposure function (NEF) belonging to the first PLMN, or a first user equipment (UE) subscribed to the first PLMN; determining whether to perform inter-PLMN communication between the first UE and a second UE subscribed to a second PLMN, the second PLMN being different from the first PLMN; transmitting, to a second ProSe function belonging to the second PLMN, a ProSe Provisioning Request message including first radio resource information for direct communication by the first UE; receiving, from the second ProSe function, a ProSe Provisioning
(Continued)

Response message including second radio resource information for direct communication by the second UE; and transmitting, to the first UE, the first ProSe Communication Create Request message including inter-PLMN communication information for direct communication with the second UE.

20 Claims, 11 Drawing Sheets

(51) Int. Cl.
 *H04W 8/00* (2009.01)
 *H04W 8/20* (2009.01)
 *H04W 76/14* (2018.01)
(58) Field of Classification Search
 USPC .......................................................... 370/328
 See application file for complete search history.

(56) References Cited

U.S. PATENT DOCUMENTS

| | | |
|---|---|---|
| 2017/0135144 A1 | 5/2017 | Fujishiro et al. |
| 2017/0201934 A1 | 7/2017 | Kim et al. |
| 2017/0223584 A1 | 8/2017 | Deng et al. |
| 2018/0035408 A1 | 2/2018 | Zhang et al. |
| 2018/0235019 A1 | 8/2018 | Buldorini et al. |
| 2019/0349951 A1* | 11/2019 | Ahmad ................. H04W 76/18 |

FOREIGN PATENT DOCUMENTS

| | | |
|---|---|---|
| KR | 10-2017-0132299 A | 12/2017 |
| KR | 10-2021-0023590 A | 3/2021 |

OTHER PUBLICATIONS

Extended European Search Report dated Sep. 14, 2022, issued in an International Application No. 20869590.8.
Korean Notice of Allowance dated Sep. 11, 2024, issued in Korean Patent Application No. 10-2019-0120130.
European Office Action dated Jul. 16, 2024, issued in European Patent Application No. 20869590.8.
International Search Report dated Dec. 21, 2020, issued in an International Application No. PCT/KR2020/013079.
3GPP TS 23.303 V15.1.0; 3rd Generation Partnership Project; Technical Specification Group Services and System Aspects; Proximity-based services (ProSe); Stage 2 (Release 15), Jun. 19, 2018.

\* cited by examiner

METHOD AND DEVICE FOR PROVIDING DIRECT COMMUNICATION IN WIRELESS COMMUNICATION SYSTEM

TECHNICAL FIELD

The disclosure relates to a method and an apparatus for providing direct communication in a wireless communication system, and more particularly, to a method and an apparatus for providing proximity-based services (ProSe) to a terminal.

BACKGROUND

In order to meet the increasing demand with respect to wireless data traffic after the commercialization of 4th generation (4G) communication systems, efforts have been made to develop enhanced 5th generation (5G) communication systems or pre-5G communication systems. For this reason, 5G communication systems or pre-5G communication systems are called as beyond 4G network communication systems or post long-term evolution (LTE) systems.

In order to achieve a high data rate, consideration is given to implementing 5G communication systems in ultra-high frequency (millimeter-wave (mmWave)) bands (e.g., 60 GHz bands). To alleviate propagation path loss of radio waves and increase propagation distances of radio waves in an ultra-high frequency band, technologies for 5G communication systems, such as beamforming, massive multi-input multi-output (MIMO), full dimensional MIMO (FD-MIMO), array antenna, analog beamforming, and large-scale antenna system are being discussed.

Also, in order to improve networks of systems, for 5G communication systems, development of technologies such as evolved small cells, advanced small cells, cloud radio access networks (cloud RANs), ultra-dense networks, device-to-device (D2D) communication, wireless backhaul, moving networks, cooperative communication, coordinated multi-points (CoMP), and interference cancellation is underway. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-centered connection network, through which humans generate and consume information, to an Internet of things (IoT) network where distributed components such as objects exchange information with each other and process the information. Internet of everything (IoE) technology in which a big data processing technology through a connection with a cloud server or the like is combined with the IoT technology has emerged. In order to implement the IoT, technical components such as sensing technology, wired/wireless communication and network infrastructure, service interface technology, and security technology are required. Recently, a sensor network, machine to machine (M2M) communication, machine type communication (MTC), D2D communication, etc., for connection between things are being studied.

In an IoT environment, intelligent Internet technology (IT) services may be provided to collect and analyze data obtained from objects connected to each other to create new value in human life. The IoT may be applied to fields such as smart homes, smart buildings, smart cities, smart cars or connected cars, smart grids, health care, smart home appliances, and advanced medical services through convergence and integration of existing IT and various industries.

Mobile communication systems may provide direct communication (e.g., proximity-based services (ProSe), PC5, sidelink communication, or D2D communication) between terminals (user equipments (UEs)). A network function (NF) for direct communication between UEs is defined, and a protocol between a UE and an NF and a protocol between an application function (AF) and an NF are defined. Also, a 5G core network may be connected with a base station and provide information necessary for direct communication to the base station and the UE. In addition, the UE may request a radio resource necessary for direct communication from the base station, and the base station may allocate the radio resource to the UE.

DESCRIPTION OF EMBODIMENTS

Solution to Problem

According to an embodiment of the disclosure, an operating method of a first proximity-based services (ProSe) function belonging to a first public land mobile network (PLMN) includes: receiving a first ProSe Communication Create Request message from an application function (AF), a network exposure function (NEF) belonging to the first PLMN, or a first user equipment (UE) subscribed to the first PLMN; determining whether to perform inter-PLMN communication between the first UE and a second UE subscribed to a second PLMN, the second PLMN being different from the first PLMN; transmitting, to a second ProSe function belonging to the second PLMN, a ProSe Provisioning Request message including first radio resource information for direct communication by the first UE; receiving, from the second ProSe function, a ProSe Provisioning Response message including second radio resource information for direct communication by the second UE; and transmitting, to the first UE, the first ProSe Communication Create Request message including inter-PLMN communication information for direct communication with the second UE.

Advantageous Effects of Disclosure

According to an embodiment of the disclosure, direct communication between subscriber terminals of different mobile network operators may be supported.

BEST MODE

Figure 1:
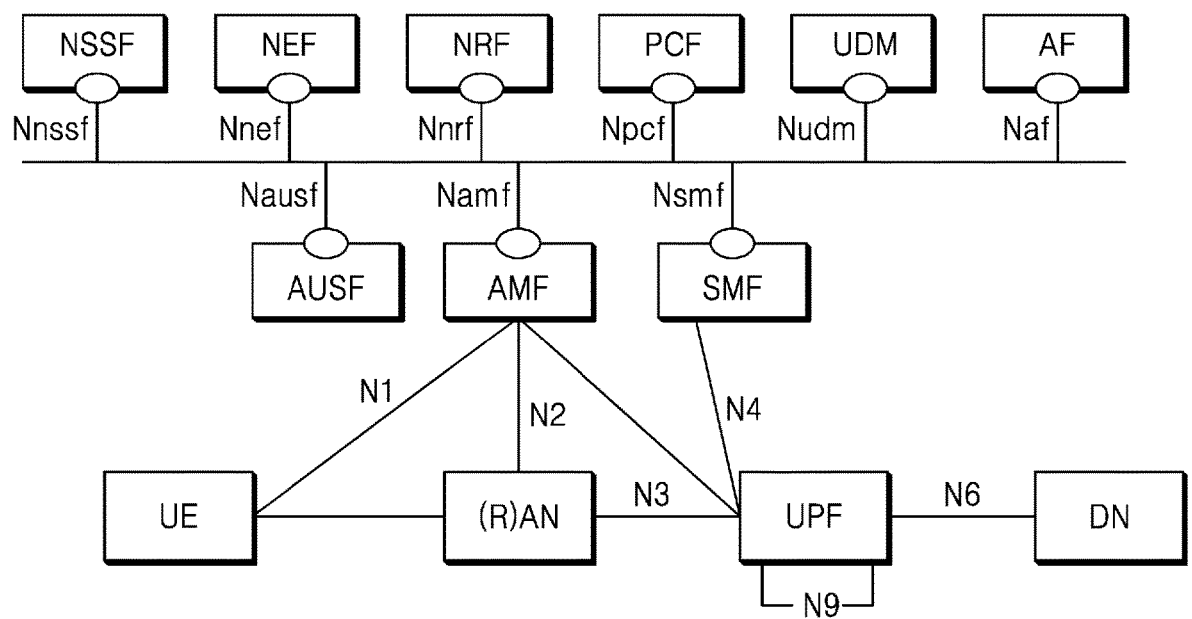
FIG. 1 illustrates a wireless communication system, according to an embodiment of the disclosure.

According to an embodiment of the disclosure, an operating method of a first proximity-based services (ProSe) function belonging to a first public land mobile network (PLMN) includes: receiving a first ProSe Communication Create Request message from an application function (AF), a network exposure function (NEF) belonging to the first PLMN, or a first user equipment (UE) subscribed to the first PLMN; determining whether to perform inter-PLMN communication between the first UE and a second UE subscribed to a second PLMN, the second PLMN being different from the first PLMN; transmitting, to a second ProSe function belonging to the second PLMN, a ProSe Provisioning Request message including first radio resource information for direct communication by the first UE; receiving, from the second ProSe function, a ProSe Provisioning Response message including second radio resource information for direct communication by the second UE; and transmitting, to the first UE, the first ProSe Communication Create Request message including inter-PLMN communication information for direct communication with the second UE.

According to an embodiment, the ProSe Communication Create Request message may include service information including at least one of an identifier (ID) of the first UE, an ID of the second UE, a home PLMN (HPLMN) ID of the first UE, and an HPLMN ID of the second UE.

According to an embodiment, the determining of whether to perform inter-PLMN communication between the first UE and the second UE subscribed to the second PLMN being different from the first PLMN may include determining whether to perform inter-PLMN communication between the first UE and the second UE based on at least one of the service information, policy information, UE subscription information, and a service level agreement (SLA) between PLMNs.

According to an embodiment, the operating method may further include: receiving a ProSe Service Request message from an access and mobility management function (AMF); and transmitting a ProSe Service Response message to the AMF.

According to an embodiment, the ProSe Service Request message may include at least one of an ID of the first UE, a ProSe authorized indication for the first UE, and information regarding a ProSe service for which the first UE is authorized.

According to an embodiment, the receiving of the ProSe Service Request message from the AMF may include receiving the ProSe Service Request message based on information indicating whether an inter-PLMN is supportable or information indicating whether an inter-PLMN for each ProSe service is supportable, the information being received by the AMF from a unified data management (UDM) or a policy and charging function (PCF).

According to an embodiment, the first ProSe function may include a ProSe Function capable of supporting an inter-PLMN or an inter-PLMN for each ProSe service.

According to an embodiment, the inter-PLMN communication information may include at least one of the first radio resource information and the second radio resource information.

According to an embodiment, the operating method may further include: receiving, from an AMF, location information regarding the first UE; determining whether to update the inter-PLMN communication information, based on the location information regarding the first UE; in case that it is determined to update the inter-PLMN communication information, transmitting, to the second ProSe function belonging to the second PLMN, a ProSe Provisioning Update Request message including the updated first radio resource information; and receiving a ProSe Provisioning Update Response message from the second ProSe function.

According to an embodiment, the ProSe Provisioning Update Response message may include the updated second radio resource information, and the operating method may further include transmitting, to the first UE, a ProSe Communication Update Request message including the inter-PLMN communication information including at least one of the updated first radio resource information and the updated second radio resource information.

According to an embodiment, an operating method of a first base station of a first public land mobile network (PLMN) includes: transmitting, in the first PLMN, radio resource information for direct communication to a second base station of a second PLMN or an access and mobility management function (AMF) connected to the first base station, the second base station being adjacent to the first base station; receiving, in the second PLMN, radio resource information for direct communication from the second base station or the AMF; and transmitting, to a first user equipment (UE) subscribed to the first PLMN, ProSe communication information including radio resource information for direct communication with a second UE subscribed to the second PLMN.

According to an embodiment, the ProSe communication information may be unicast or broadcast.

According to an embodiment, a first proximity-based services (ProSe) function belonging to a first public land mobile network (PLMN) includes: a transceiver; and at least one processor configured to: receive a first ProSe Communication Create Request message from an application function (AF), a network exposure function (NEF) belonging to the first PLMN, or a user equipment (UE) subscribed to the first PLMN; determine whether to perform inter-PLMN communication between the first UE and a second UE subscribed to a second PLMN, the second PLMN being different from the first PLMN; transmit, to a second ProSe function belonging to the second PLMN, a ProSe Provisioning Request message including first radio resource information for direct communication by the first UE; receive, from the second ProSe function, a ProSe Provisioning Response message including second radio resource information for direct communication by the second UE; and transmit, to the first UE, the first ProSe Communication Create Request message including inter-PLMN communication information for direct communication with the second UE.

According to an embodiment, a first base station of a first public land mobile network (PLMN) includes: a transceiver; and a processor configured to (execute instructions to?): transmit, in the first PLMN, radio resource information for direct communication to a second base station of a second PLMN or an access and mobility management function (AMF) connected to the first base station, the second base station being adjacent to the first base station; receive, in the second PLMN, radio resource information for direct communication from the second base station or the AMF; and transmit, to a first user equipment (UE) subscribed to the first PLMN, ProSe communication information including radio resource information for direct communication with a second UE subscribed to the second PLMN.

MODE OF DISCLOSURE

Hereinafter, embodiments of the disclosure will be described in detail with reference to the accompanying drawings. In the following descriptions of embodiments, descriptions of techniques that are well known in the art and are not directly related to the disclosure are omitted. This is to prevent the unnecessary descriptions from obscuring the subject matters of the disclosure and to further clearly describe the gist of the disclosure.

For the same reasons, components may be exaggerated, omitted, or schematically shown in drawings for clarity. Also, the size of each component does not entirely reflect the actual size. In each drawing, components that are the same or are in correspondence are rendered the same reference numeral.

The advantages and features of the disclosure and methods of achieving them will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that the disclosure will be thorough and complete, and will fully convey the concept of the disclosure to those of ordinary skill in the art. The scope of the disclosure is only defined in the claims. In the specification, the same components are denoted by the same reference numerals.

In this regard, it will be understood that combinations of blocks in flowcharts or process flow diagrams may be performed by computer program instructions. Because these computer program instructions may be loaded into a processor of a general-purpose computer, a special purpose computer, or other programmable data processing equipment, the instructions, which are executed through the processor of the computer or other programmable data processing equipment, generate means for implementing functions specified in the flowchart block(s). Because these computer program instructions may also be stored in a computer usable or computer-readable memory that may direct a computer or other programmable data processing equipment to function in a particular manner, the instructions stored in the computer usable or computer-readable memory may produce an article of manufacture including instruction means that implement the functions specified in the flowchart block(s). Because the computer program instructions may also be loaded onto a computer or other programmable data processing equipment, a series of operational steps may be performed on the computer or other programmable equipment to produce a computer implemented process, and thus the instructions executed on the computer or other programmable equipment may provide steps for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown successively may actually be executed substantially concurrently, or the blocks may sometimes be performed in a reverse order according to the corresponding function.

In this regard, the term ' . . . er/or' or 'module' used herein refers to a software or hardware component, such as field programmable gate array (FPGA) or application specific integrated circuit (ASIC) which plays a certain role. However, the term ' . . . er/or' or 'module' is not limited to software or hardware. The term ' . . . er/or' or 'module' may be configured in an addressable storage medium or may be configured to reproduce one or more processors. Thus, for example, the term ' . . . ers/ors' or 'modules' may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. The functionality provided in components and ' . . . ers/ors' or 'modules' may be combined into fewer components and ' . . . ers/ors' or 'modules' may be further separated into additional components and ' . . . ers/ors' or 'modules'. Further, the components and ' . . . ers/ors' or 'modules' may be implemented to operate one or more central processing units (CPUs) in a device or a secure multimedia card. Also, according to an embodiment, a ' . . . er/or' or 'module' may include one or more processors.

In the following description, terms used to identify an access node, terms used to indicate a network entity or network functions (NFs), terms used to indicate messages, terms used to indicate an interface between network entities, terms used to indicate various pieces of identification information are exemplified for convenience of description. Accordingly, the disclosure is not limited to terms to be described below, and other terms indicating objects having equal technical meanings may be used.

Hereinafter, for convenience of description, the disclosure uses terms and names defined by the 3rd generation partnership project long-term evolution (3GPP LTE) standard, the new radio (NR) standard, and the 5th generation (5G) standard. However, the disclosure is not limited to these terms and names, and may be equally applied to systems conforming to other standards.

Meanwhile, the term 'service' used herein may be used interchangeably to refer to an operation (e.g., an NF service) in which a specific communication equipment (or an NF) performs a request of another communication equipment (or an NF), a service provided by a mobile network operator (e.g., a voice service, a text service, a data service, a communication service through a network (e.g., a communication service through a Uu interface), a direct communication service (e.g., a communication service through a PC5 (sidelink) interface), etc.), or an application layer service provided by an over the top (OTT) operator (e.g., a messenger service, a game service, etc.).

FIG. 1 illustrates a wireless communication system, according to an embodiment of the disclosure.

According to an embodiment of the disclosure, a 5G core network may include NFs such as an access and mobility management function (AMF), a session management function (SMF), a proximity-based services (ProSe) function, a policy and charging function (PCF), a network exposure function (NEF), a unified data management (UDM), a user plane function (UPF), a unified data repository (UDR), etc. A terminal (or a user equipment (UE)) may access the 5G core network through a base station (or a radio access network (RAN)).

The AMF is an NF for managing wireless network access and mobility of the UE. The SMF is an NF for managing a packet data network (PDN) connection provided for the UE. The PDN connection is referred to as a protocol data unit (PDU) session. PDU session information may include quality of service (QoS) information, charging information, or packet processing information. The PCF is an NF for applying a service policy, a charging policy, and a PDU session policy of a mobile network operator on the UE. The UDM is an NF for storing and managing information regarding a subscriber, that is, subscription information. The NEF may access information for managing the UE in the 5G network. For example, the NEF may access information regarding subscription to a mobility management event of the UE, subscription to a session management event of the UE, a request for session-related information, charging information setting of the UE, and a request to change a PDU session policy for the UE. The NEF is connected to the NFs of the 5G core network to transmit information regarding the UE to the NFs or to externally report information regarding the UE. The AP may use a service and a function provided by the 5G network through the NEF.

A 5G-RAN refers to a base station for providing a wireless communication function to the UE. The 5G-RAN may allocate a radio resource for direct communication to the UE. The UPF functions as a gateway for transmitting a packet transmitted/received by the UE and is controlled by the SMF. The UPF is connected to a data network (DN) and transmits a data packet generated in a 5G system to an external DN. For example, the UPF may be connected to a DN connected to the Internet and may route a data packet transmitted by the UE to the Internet. The UDR is an NF for storing and managing data. For example, the UDR may store UE subscription information and provide the UE subscription information to the UDM. The UDR may store operator policy information and provide the operator policy information to the PCF. The UDR may store network service exposure-related information and provide the network service exposure-related information to the NEF.

The ProSe function refers to a logical function for performing an operation of a network necessary to provide a proximity service. One or more ProSe functions may be present in a public land mobile network (PLMN) and may be deployed to serve a specific area or to serve specific UEs. The ProSe function may perform a direct provisioning function for providing information necessary for the UE to use a ProSe service. The direct provisioning function refers to a function of provisioning necessary information to the UE for a direct discovery function used for UEs in proximity to directly discover each other or a direct communication function used for device-to-device (D2D) direct communication. Also, the ProSe function may perform a function of managing a name or code used for direct discovery to support the direct discovery function of the UE. In addition, the ProSe function may trigger a corresponding function so that the UE may perform the direct discovery function, and may also provide a charging function or a security-related function for using the ProSe service.

According to an embodiment of the disclosure, the ProSe function may be referred to as a name other than the ProSe function, and another NF (e.g., the PCF) may also provide a function and an operation (e.g., a protocol and a signaling procedure for communication between a UE, an NF, and an AF) provided by the ProSe function.

Services provided by respective NFs are defined by the respective NFs and may be referred to as Npcf, Nsmf, Namf, and Nnef services. For example, when the AMF transmits a session-related message to the SMF, the AMF may use a service (or an application program interface (API)) called Nsmf_PDUSession_CreateSMContext. The ProSe function also defines an NF service and may be connected to other NFs. For example, a service provided by the ProSe function may be defined as an Nprose service, and the ProSe function may provide a service (or an API) such as Nprose_event_notification.

The AF may be an application server (AS) for providing a function for using the ProSe service. That is, the AF may be a ProSe AS, or a network controlled interactive service (NCIS) AS for providing an NCIS service. The ProSe AS or the NCIS AS may operate like an AF of a 3GPP system and may provide, for example, the following functions.

Store and manage an ID (i.e., a ProSe user ID) that a UE needs to use to use the ProSe service, and manage metadata about the ProSe user ID (e.g., which group a ProSe user corresponding to the ID belongs to, which protocol to use, which application to use, etc.)

Store/manage a mapping relationship between an application layer user ID and a ProSe user ID Manage authorization-related information so that UEs belonging to one group may directly discover each other or directly communicate with each other Manage QoS requirements necessary for direct communication and make a request to the 5G system Provide service information for direct communication to the 5G system In the 3GPP system, a special service for an NCIS, called an NCIS service, may be provided. The NCIS service may refer to a service that enables one or more UEs to participate in an NCIS group and to share data with each other for interactive gaming or data sharing. The NCIS group may refer to a group of application layers using the same NCIS session. An NCIS session may refer to a session in which all UEs in one session, for example, UEs belonging to the same NCIS group, may share background information, state information, and update information regarding an NCIS application with each other. That is, all UEs belonging to one NCIS session may have the same background information, state information, and update information. UEs belonging to the same NCIS group may use D2D communication in proximity to each other. Alternatively, even UEs belonging to the same NCIS group may communicate through a network when the UEs are located far from each other.

Also, in the 3GPP system, a disaster safety net service, called a public safety service (interchangeably used with a mission critical service), may be provided.

The UE may access the AMF through the base station and transmit/receive a control plane signaling message to/from the 5G core network. Also, the UE may access the UPF through the base station and transmit/receive user plane data to/from the DN. An AS for providing an application layer service to the UE may be referred to as an AF when the AS transmits/receives a control plane signaling message to/from the 5G core network, and may be referred as a DN when the AS transmits/receives user plane data to/from the UE. Also, the AF and the DN may be interchangeably used as a name for the AS.

A UE supporting direct communication may obtain configuration information for direct communication from the 5G core network (e.g., the AMF, the PCF, and or the ProSe function). The UE may perform various operations (e.g., ProSe mode 1, ProSe mode 2, ProSe mode 3, ProSe mode 4, out-of-coverage, and in-coverage operations) for direct communication based on the configuration information for direct communication obtained from the 5G core network.

For example, the UE may transmit, to the base station, a message requesting information regarding a resource through which a message is to be transmitted, in order to transmit a message through the PC5 interface, and the base station may transmit a response message to the UE by selecting an optimal sidelink transmission resource based on a current network situation. Whenever the UE transmits a message, the UE may request sidelink resource information to the base station. Hereinafter, according to the disclosure, such an operation is referred to as a mode 3 or mode 1 operation. In an LTE system, the operation may be referred to as a mode 3 operation, and in an NR system, the operation may be referred to as a mode 1 operation.

As another example, in order to transmit a message through the PC5 interface, the UE may transmit a message requesting information regarding a resource, through which a message is to be transmitted to the base station, and the base station may transmit, to the UE, a response message including information regarding a sidelink resource pool available for the UE. The UE may store the information regarding the sidelink resource pool received from the base station, and whenever the UE transmits a vehicle-to-everything (V2X) message, the UE may transmit the message by selecting a resource from the stored sidelink resource pool. Alternatively, even though the UE does not explicitly request resource information from the base station, the base station may inform the UE of the information regarding the sidelink resource pool through system information provided to the UE, and the UE may select a resource through which a V2X message is to be transmitted, by using the information regarding the sidelink resource pool received as described above. Hereinafter, according to the disclosure, such an operation is referred to as an in-coverage operation of mode 4 or mode 2. In the LTE system, the operation may be referred to as mode 4, and in the NR system, the operation may be referred to as mode 2.

As another example, sidelink resource information for transmitting a V2X message may be pre-configured in the UE, and the UE may transmit the V2X message by using the pre-configured sidelink resource information. Such an operation may not require communication between the UE and the base station. According to the disclosure, the operation is referred to as an out-of-coverage operation of mode 4 or mode 2. In the LTE system, the operation may be referred to as mode 4, and in the NR system, the operation may be referred to as mode 2.

Embodiment 1

In Embodiment 1, a method of selecting a ProSe function supporting inter-PLMN communication is described. In further detail, in Embodiment 1, a method of registering a UE that intends to use D2D communication (hereinafter, referred to as direct communication or sidelink communication) in a mobile communication system is described. A registration request message transmitted by the UE to the mobile communication system may include information requested by the UE to use the ProSe service. During a registration procedure, the UE may provide direct communication-related information to the 5G core network. Also, the 5G core network may determine, based on UE subscription information, whether a direct communication service requested by the UE is allowed to be provided to the UE, and may authorize the UE. In addition, the 5G core network may provide such authorization information to the base station.

Figure 2:
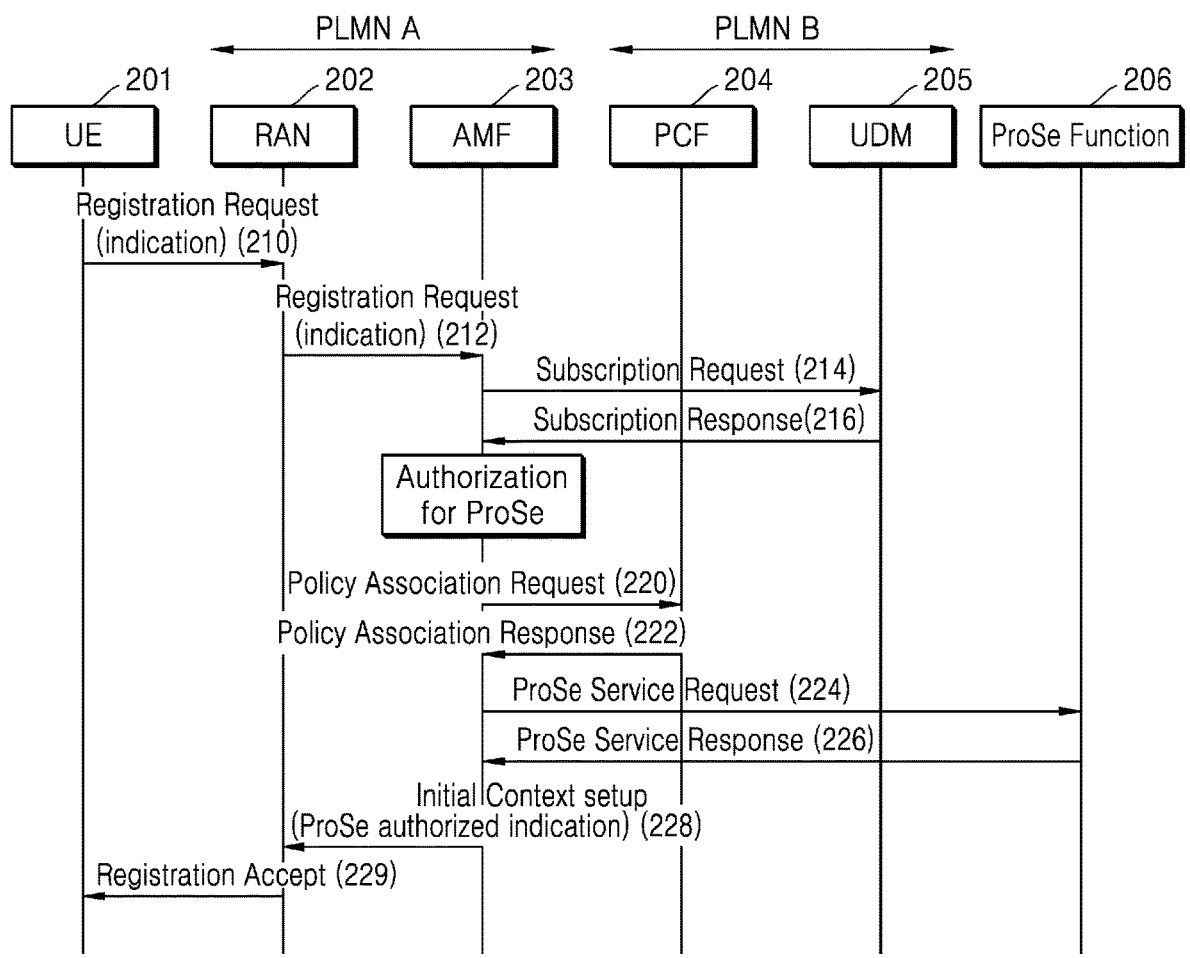
FIG. 2 illustrates a terminal registration procedure, according to an embodiment of the disclosure.

FIG. 2 illustrates a UE registration procedure, according to an embodiment of the disclosure.

Referring to FIG. 2, in operation 210, a UE 201 may transmit a Registration Request message. The UE 201 may include information regarding a capability (e.g., a ProSe capability, an NCIS capability, a public safety capability, etc.) of the UE 201 in the Registration Request message. Also, the UE 201 may include, in the Registration Request message, network slice information (e.g., ProSe single-network slice selection assistance information (S-NSSAI), mission critical S-NSSAI, etc.) that the UE 201 intends to use by accessing a network. The network slice information (which may be hereinafter interchangeably used with 'slice information') may be referred to as S-NSSAI, and one S-NSSAI may refer to a specific service type (e.g., ProSe, NCIS, mission critical, etc.). The UE may include at least one S-NSSAI in the Registration Request message. The at least one S-NSSAI included in the Registration Request message may be referred to as requested NSSAI.

In operation 212, a base station 202 that has received the Registration Request message from the UE 201 may select an AMF to which the received message is to be transmitted, based on information (e.g., requested NSSAI (S-NSSAI), a 5G-globally unique temporary identifier (GUTI) of a UE, a UE capability, etc.) received from the UE 201. The base station 202 may transmit the Registration Request message to the selected AMF 203.

In operation 214, the AMF 203 may request UE subscription information from a UDM 205. A message requesting the UE subscription information may include a UE ID (e.g., a 5G-GUTI, an international mobile subscriber identity (IMSI), a subscription permanent identifier (SUPI), a generic public subscription identifier (GPSI), or the like). The UDM 205 may search for UE subscription information corresponding to the UE ID. The UE subscription information may include information regarding whether a UE has subscribed to a direct communication service.

In operation 216, the AMF 203 may obtain the UE subscription information from the UDM 205. For example, the UE subscription information may include information regarding a ProSe capability of the UE and information regarding a ProSe service available for the UE. The information regarding the ProSe capability of the UE may include a radio access technology (RAT) type (e.g., LTE, NR, or the like) supported by the UE and information indicating whether an inter-PLMN is supportable. The ProSe service may include NCIS, public safety, PC5 discovery, direction communication, UE-to-UE relay, UE-to-network relay, and inter-PLMN communication. Alternatively, the UE subscription information may include information regarding whether an inter-PLMN for each ProSe service is supportable.

In operation 218, the AMF 203 may determine whether a service including a function requested by the UE 201 in operation 212 or a D2D communication service is allowed for provision, based on the UE subscription information received from the UDM 205. When the AMF 203 determines that the service including the function or the D2D communication service requested by the UE 201 is allowed for provision, the AMF 203 may authorize the corresponding UE. For example, when the UE 201 has requested a ProSe capability (e.g., a ProSe capability, an NCIS capability, a public safety capability, inter-PLMN communication, or the like), the AMF 203 may identify whether the UE subscription information includes the ProSe capability. When the UE subscription information includes the ProSe capability requested by the UE or the UE subscription information includes the ProSe capability requested by the UE or ProSe S-NSSAI requested by the UE, the AMF 203 may authorize the use of the ProSe service by the UE 201. When the use of the ProSe service by the UE is successfully authorized, operation 224 may be performed. As described above, the AMF may authorize the use of the ProSe service by the UE during a UE registration procedure.

In operations 220 and 222, the AMF 203 may establish a policy association with a PCF 204 and obtain policy information from the PCF 204. The policy information may include policy information necessary for the UE to use the ProSe service. For example, the policy information may include whether the inter-PLMN is supportable. Alternatively, the policy information may include whether the inter-PLMN for each ProSe service is supportable.

In operation 224, the AMF 203 may select a ProSe function 206 based on information (e.g., the ProSe capability, the requested NSSAI, etc.) received from the UE in operation 212, information (e.g., ProSe function selection subscription data or the like) received from the UDM in operation 216, and information (e.g., ProSe service policy information) received from the PCF in operation 222. The AMF 203 may transmit a ProSe Service Request message to the selected ProSe function 206. The ProSe Service Request message may include the UE ID (e.g., the 5G-GUTI, the IMSI, the SUPI, the GPSI, or the like), a ProSe authorized indication, and information regarding a ProSe service for which the UE is authorized. For example, when the UE subscription information or the policy information indicates that the inter-PLMN is supportable, the AMF 203 may select a ProSe function capable of supporting the inter-PLMN.

In operation 226, the ProSe function 206 may transmit a ProSe Service Response message to the AMF 203.

In operation 228, the AMF 203 may transmit an Initial UE Context Setup message or a UE Context Modification Request message to the base station 202. The Initial UE Context Setup message or the UE Context Modification request message may be transmitted together with a Registration Accept message transmitted by the AMF 203 to the UE 201. The AMF 203 may include, in the message in operation 228, the ProSe authorized indication, the information regarding the ProSe service (e.g., NCIS, public safety, or the like) for which the UE is authorized, information (e.g., an indication indicating whether the inter-PLMN is available) indicating whether an inter-PLMN is available, and information (e.g., an indication indicating whether the inter-PLMN for each ProSe service is available) indicating whether an inter-PLMN for each ProSe service is available. The base station 202 may store the received information.

The information provided by the AMF 203 to the base station 202 may be information included in the UE subscription information received by the AMF 203 from the UDM 205 in operation 216, information included in the information received by the AMF 203 from the PCF 204 in operation 222, or information included in the information received by the AMF 203 from the ProSe function 206 in operation 226.

In operation 229, the base station 202 may transmit the Registration Accept message to the UE 201. The registration accept message may include information (e.g., ProSe authorized, NCIS authorized, ProSe S-NSSAI, NCIS S-NSSAI, etc.) regarding a ProSe service available for the UE 201, the information (e.g., the indication indicating whether the inter-PLMN is available) indicating whether the inter-PLMN is available, and the information (e.g., the indication indicating whether the inter-PLMN for each ProSe service is available) indicating whether the inter-PLMN for each ProSe service is available. The UE 201 may store the received information and may use the information for ProSe direct communication. The UE that has completed the UE registration procedure may identify that ProSe communication is possible, based on the information included in the Registration Accept message.

Also, in another embodiment of the disclosure, the UE may select a ProSe function supporting inter-PLMN communication, by using pre-configured UE configuration information. For example, the UE may store ProSe function-related information (e.g., IP address(es) or fully qualified domain name (FQDN) information regarding the ProSe function). According to an embodiment of the disclosure, the UE supporting the inter-PLMN may store ProSe function-related information supporting the inter-PLMN. Alternatively, the UE supporting the inter-PLMN may also store information indicating whether the stored ProSe function-related information supports the inter-PLMN or does not support the inter-PLMN. In order to communicate with the ProSe function supporting the inter-PLMN, the UE may perform a domain name system (DNS) query by using the ProSe function-related information and may select the ProSe function supporting the inter-PLMN.

Embodiment 2

In Embodiment 2, a direct communication between subscriber UEs of different mobile network operators is described. According to a 5G core network of an embodiment of the disclosure, for inter-PLMN communication, an interaction method between ProSe functions and inter-PLMN communication information provided by the 5G core network to a UE are described. Also, according to an embodiment of the disclosure, the 5G core network may update the inter-PLMN communication information.

Figure 3:
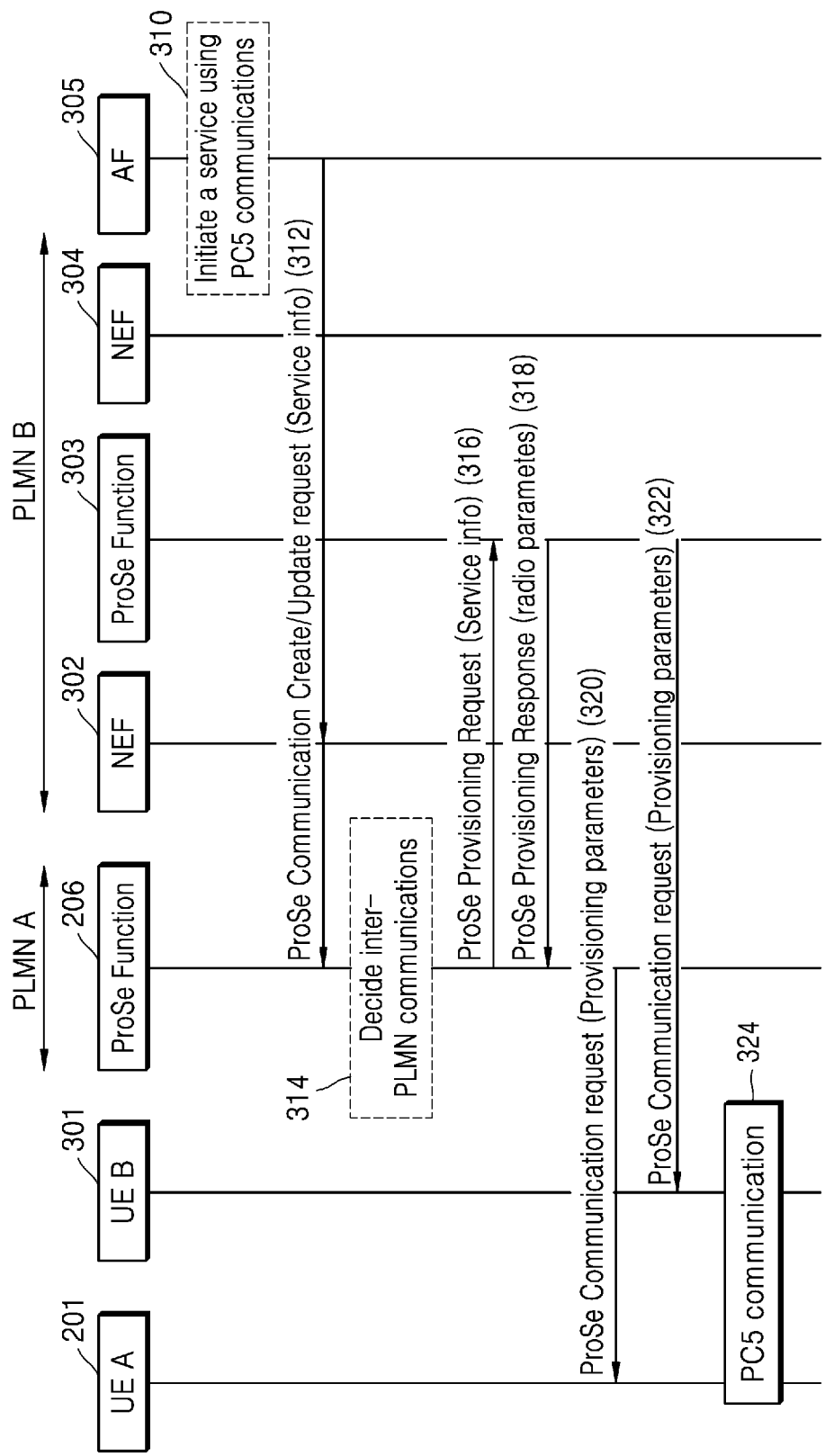
FIG. 3 illustrates a procedure in which a $5^{th}$ generation (5G) core network provides inter-public land mobile network (PLMN) communication information to a terminal, according to an embodiment of the disclosure.

FIG. 3 illustrates a procedure in which a 5G core network provides inter-PLMN communication information to a UE, according to an embodiment of the disclosure.

Referring to FIG. 3, according to an embodiment of the disclosure, UEs 201 and 301 may support direct communication. A UE A 201 is a UE subscribed to a mobile network operator PLMN A, and a UE B 301 is a UE subscribed to a mobile network operator PLMN B. A ProSe function 206, which is an NF constituting a 5G core network of the PLMN A, may support a direct communication function. A ProSe function 303, which is an NF constituting a 5G core network of the PLMN B, may support a direct communication function. The UE A 201 may perform the registration procedure as shown in FIG. 2 and use a direct communication service by communicating with the ProSe function 206. The UE B 301 may perform the registration procedure as shown in FIG. 2 and use a direct communication service by communicating with the ProSe function 303.

In operation 310, an application server 305 may determine to initiate direct communication. For example, the application server 305 may exchange service information for direct communication by communicating with the UEs 201 and 301 and may determine to initiate direct communication based on the service information. The application server 305 may determine information for a service using direct communication. For example, the information for the service using direct communication may include at least one of a UE ID of a UE to participate in direct communication and a home PLMN (HPLMN) ID of the UE. Also, the application server 305 may determine a ProSe function of the UE to participate in direct communication. For example, the application server 305 may obtain, from the UE, information regarding a serving ProSe function of the UE. Alternatively, the application server 305 may obtain information regarding a serving ProSe function of the UE from the 5G core network during the UE registration procedure. Alternatively, the application server 305 may store and use ProSe function information mapped to the HPLMN ID of the UE. Alternatively, the 5G core network may store information regarding a serving ProSe function of the UE in a binding support function (BSF), and upon a request from the application server 305, may provide the information regarding the serving ProSe function of the UE to the application server 305.

In operation 312, the application server 305 may provide service information for direct communication to a 5G core network of a serving PLMN accessed by the UE (201 or 301). For example, the AF 305 may transmit a ProSe Communication Create Request message to an NEF 302. Alternatively, when the AF 305 has identified information regarding a serving ProSe function of the UE 201, the AF 305 may directly transmit a ProSe Communication Create Request message to the ProSe function 206.

The ProSe Communication Create Request message may include service information (e.g., an ID of the UE 201, ID(s) of counterpart UE(s) 301, an HPLMN ID of the UE 201, and HPLMN ID(s) of the counterpart UE(s) 301). The NEF 302 may transmit the ProSe Communication Create Request message to the ProSe function 206. For example, the NEF 302 may store the service information, and a UDR may transmit, to the ProSe function 206, a notification message including the stored service information. Alternatively, the NEF 302 may store the service information in the UDR through a UDM, and the UDM may transmit, to the ProSe function 206, a notification message including the service information stored in the UDR. Alternatively, the NEF 302 may directly transmit the service information to the ProSe function 206.

The AF 305 may transmit the ProSe Communication Create Request message to the ProSe function 303 of the PLMN B through the same procedure as described in operation 312.

The ProSe function 206 may receive the service information by using various methods as described above, and in operation 314, the ProSe function 206 that has received the service information may determine whether inter-PLMN communication is required, based on the service information received from the AF 305, a mobile network operator policy (e.g., ProSe policy), and UE subscription information. For example, the ProSe function 206 may determine that the counterpart UE 301 is not a UE subscribed to the PLMN A, based on the UE ID or the HPLMN ID of the counterpart UE 301. Also, the ProSe function 206 may determine that the counterpart UE 301 is a UE subscribed to an HPLMN, that is, the PLMN B, of the counterpart UE 301, based on the UE ID or the HPLMN ID of the counterpart UE 301. In addition, the ProSe function 206 may determine whether communication with the ProSe function of the PLMN B is possible, based on a service level agreement (SLA) between PLMNs.

If the ProSe function 206 of the PLMN A may communicate with the ProSe function of the PLMN B, operation 316 may be performed.

When the UE A 201 and the UE B 301 are UEs subscribed to different PLMNs, the UEs may use different radio resources for direct communication. Accordingly, in order for the UEs to perform direct communication, information regarding a radio resource available for or used by each UE needs to be identified. According to an embodiment of the disclosure, the ProSe function needs to be able to obtain information regarding radio resources used by different PLMNs. For example, the ProSe function may identify information regarding a radio resource used by another PLMN, by using pre-stored configuration information. Alternatively, the ProSe function may perform operation 316 to obtain information regarding a radio resource used by another PLMN from an NF (e.g., a ProSe function) of the other PLMN.

In operation 316, the ProSe function 206 may transmit a ProSe Provisioning Request message to the ProSe function 303 of the PLMN B. The ProSe Provisioning Request message may include information (e.g., frequency information) regarding a radio resource to be used by the UE A 201 for direct communication. The information regarding the radio resource may be determined based on a location of the UE A 201 and a service to be used by the UE A 201.

The ProSe function 303 that has received the ProSe Provisioning Request message may store the received information regarding the radio resource to be used by the UE A 201 for direct communication.

In operation 318, the ProSe function 303 may return a ProSe Provisioning Response message to the ProSe function 206 of the PLMN A. The ProSe Provisioning Response message may include information (e.g., frequency information) regarding a radio resource to be used by the UE B 301 for direct communication. The information regarding the radio resource may be determined based on a location of the UE B 301 and a service to be used by the UE B 301.

The ProSe function 206 that has received the ProSe Provisioning Response message may store the received information regarding the radio resource to be used by the UE B 301 for direct communication.

In operation 320, the ProSe function 206 may transmit a ProSe Communication Request message to the UE A 201. The ProSe Communication Request message may include information (e.g., frequency information) regarding a radio resource available for or used by the UE B 301 for direct communication.

In operation 324, the UE A 201 that has received the ProSe Communication Request message may initiate direct communication with the UE B 301. That is, the UE A 201 may receive data transmitted as the information regarding the radio resource available for or used by the UE B 301 for direct communication.

In operation 322, the ProSe function 303 may transmit a ProSe Communication Request message to the UE B 301. The ProSe Communication Request message may include information regarding a radio resource available for or used by the UE A 201 for direct communication.

In operation 324, the UE B 301 that has received the ProSe Communication Request message may initiate direct communication with the UE A 201. That is, the UE B 301 may receive data transmitted through the radio resource available for or used by the UE A 201 for direct communication.

Figure 4:
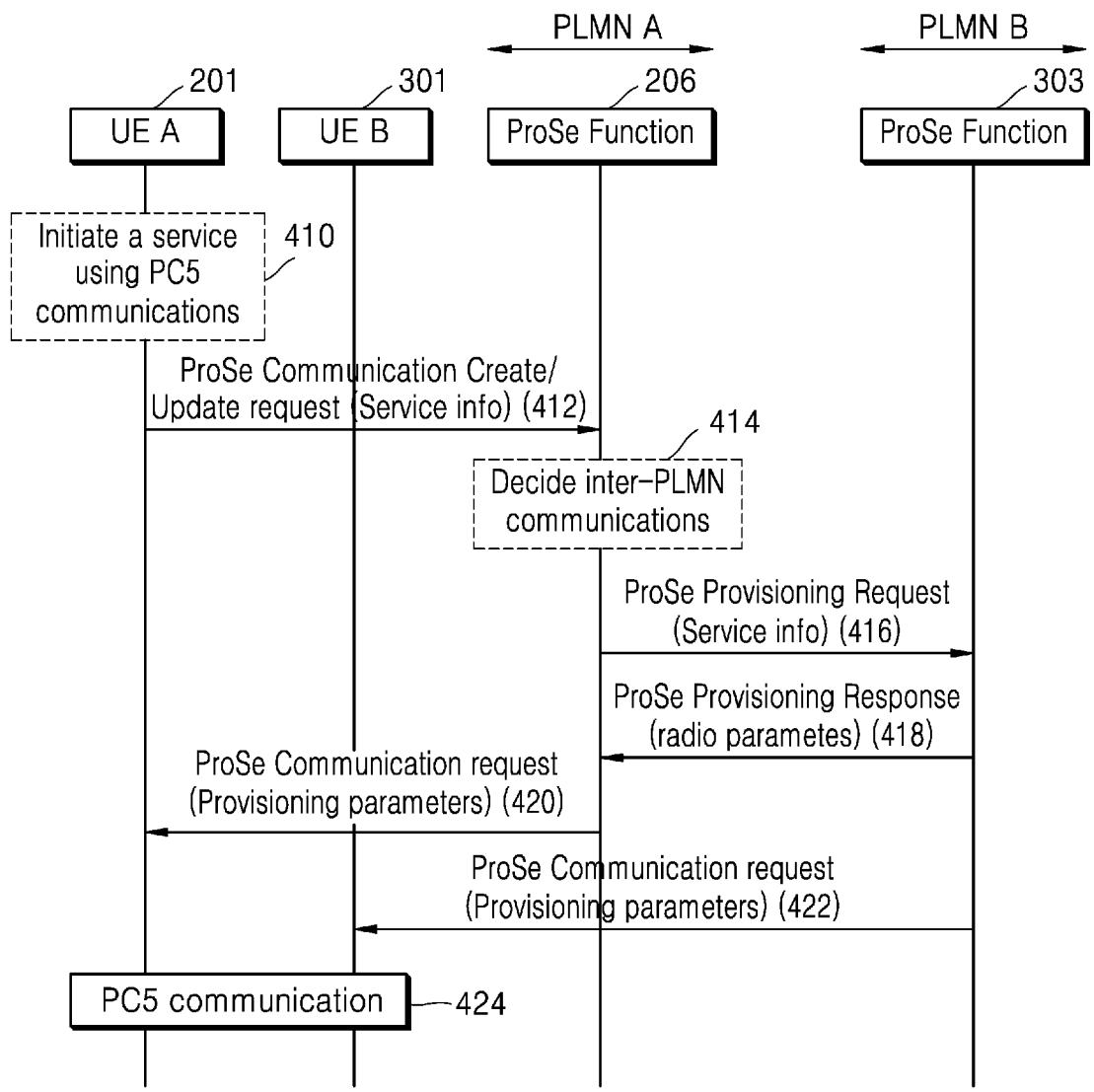
FIG. 4 illustrates a procedure in which a 5G core network provides inter-PLMN communication information to a terminal, according to another embodiment of the disclosure.

FIG. 4 illustrates a procedure in which a 5G core network provides inter-PLMN communication information to a UE, according to another embodiment of the disclosure.

Referring to FIG. 4, according to an embodiment of the disclosure, the UEs 201 and 301 may support direct communication. The UE A 201 is a UE subscribed to the mobile network operator PLMN A, and the UE B 301 is a UE subscribed to the mobile network operator PLMN B. The ProSe function 206, which is an NF constituting the 5G core network of the PLMN A, may support a direct communication function. The ProSe function 303, which is an NF constituting the 5G core network of the PLMN B, may support a direct communication function. The UE A 201 may perform the registration procedure as shown in FIG. 2 and use a direct communication service by communicating with the ProSe function 206. The UE B 301 may perform the registration procedure as shown in FIG. 2 and use a direct communication service by communicating with the ProSe function 303.

In operation 410, the UE 201 may determine to initiate direct communication. The UE 201 may determine information for a service using direct communication. For example, the information for the service using direct communication may include at least one of a UE ID of a UE to participate in direct communication and an HPLMN ID of the UE.

In operation 412, the UE 201 may directly transmit a ProSe Communication Create Request message to the ProSe function 206.

The ProSe Communication Create Request message may include service information (e.g., an ID of the UE 201, ID(s) of counterpart UE(s) 301, an HPLMN ID of the UE 201, and HPLMN ID(s) of the counterpart UE(s) 301).

In operation 414, the ProSe function 206 that has received the service information may determine whether inter-PLMN communication is required, based on the service information received from the UE 201, a mobile network operator policy (e.g., ProSe policy), and UE subscription information. For example, the ProSe function 206 may determine that the counterpart UE 301 is not a UE subscribed to the PLMN A, based on the UE ID or the HPLMN ID of the counterpart UE 301. Also, the ProSe function 206 may determine that the counterpart UE 301 is a UE subscribed to an HPLMN, that is, the PLMN B, of the counterpart UE 301, based on the UE ID or the HPLMN ID of the counterpart UE 301. In addition, the ProSe function 206 may determine whether communication with the ProSe function of the PLMN B is possible, based on an SLA between PLMNs. If the ProSe function 206 of the PLMN A may communicate with the ProSe function of the PLMN B, operation 416 may be performed.

When the UE A 201 and the UE B 301 are UEs subscribed to different PLMNs, the UEs may use different radio resources for direct communication. Accordingly, in order for the UEs to perform direct communication, information regarding a radio resource available for or used by each UE needs to be identified. According to an embodiment of the disclosure, the ProSe function needs to be able to obtain information regarding radio resources used by different PLMNs. For example, the ProSe function may identify information regarding a radio resource used by another PLMN, by using pre-stored configuration information. Alternatively, the ProSe function may perform operation 416 to obtain information regarding radio resources used by another PLMN from an NF (e.g., a ProSe function) of the other PLMN.

Hereinafter, the descriptions of operations 416 to 424 are the same as those of operations 316 to 324 of FIG. 3, and thus, redundant descriptions are briefly described.

In operation 416, the ProSe function 206 may transmit a ProSe Provisioning Request message to the ProSe function 303 of the PLMN B, and in operation 418, the ProSe function 303 may return a ProSe Provisioning Response message to the ProSe function 206 of the PLMN A.

In operation 420, the ProSe function 206 may transmit a ProSe Communication Request message to the UE A 201, and in operation 424, the UE A 201 that has received the ProSe Communication Request message may initiate direct communication with the UE B 301.

In operation 422, the ProSe function 303 may transmit a ProSe Communication Request message to the UE B 301, in operation 424, the UE B 301 that has received the ProSe Communication Request message may initiate direct communication with the UE A 201.

Figure 5:
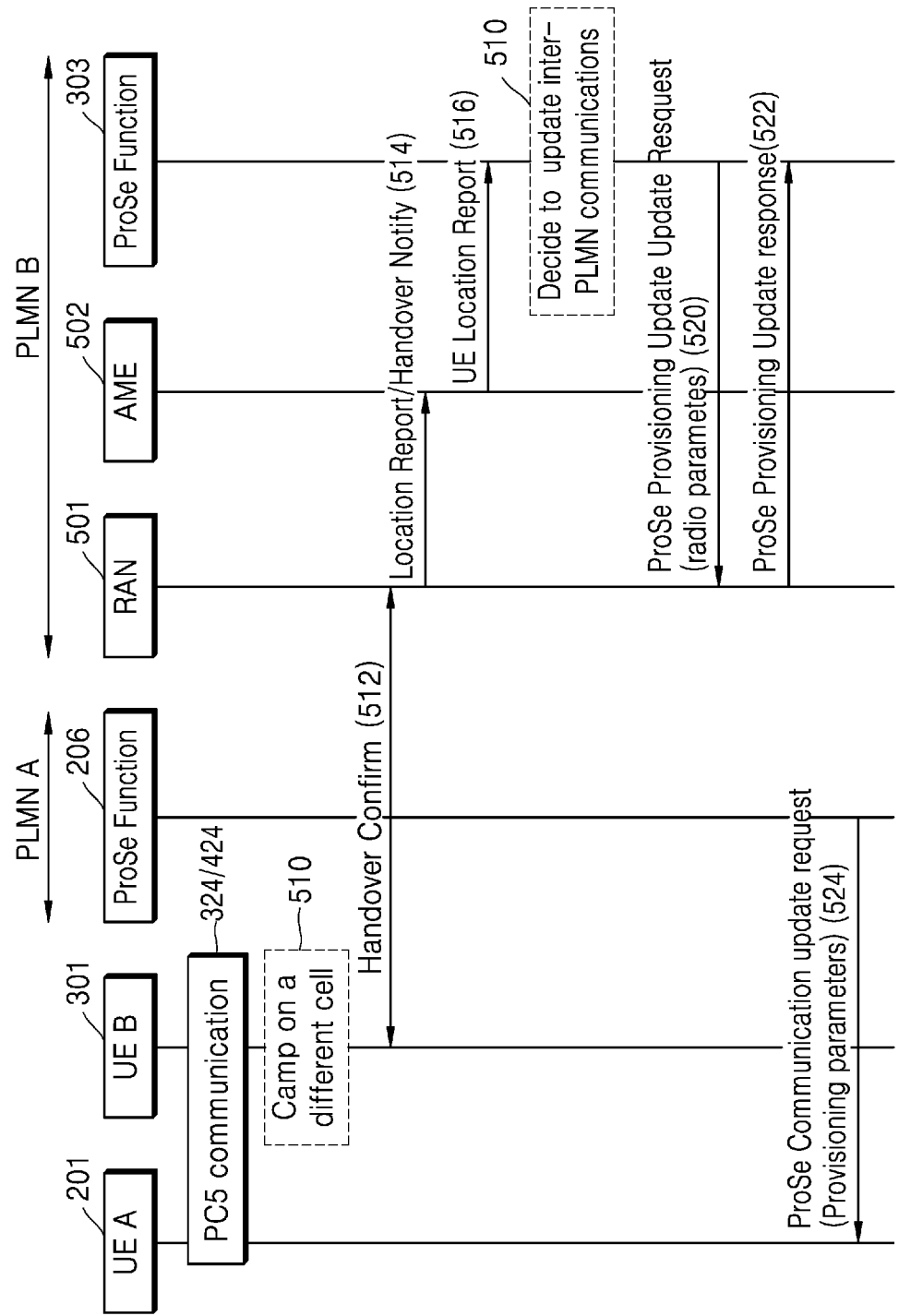
FIG. 5 illustrates a procedure for updating inter-PLMN communication information, according to an embodiment of the disclosure.

FIG. 5 illustrates a procedure for updating inter-PLMN communication information, according to an embodiment of the disclosure.

Referring to FIG. 5, the UE A 201 and the UE B 301 may use direct communication in operation 324 or 424 through the procedure shown in FIG. 3 or 4.

In operation 510, the UE B 301 may determine to move to another base station and may transmit a message related to the movement to the base station 501. For example, the UE B 301 may transmit a Handover Confirm message to a base station 501.

In operation 512, the base station 501 may perform a procedure due to the movement of the UE B 301. For example, the base station 501 may report information regarding a location of the UE 301 to a serving AMF 502 of the UE B 301.

The AMF 502 that has received the information regarding the location of the UE may determine whether to perform operation 516, based on at least one of information received from the base station 501, information transmitted to or received from a ProSe function during the UE registration procedure, and mobile network operator policy information. For example, when a current location of the UE B 301 is different from information regarding a location previously reported by the AMF 502 to the ProSe function 303, the AMF 502 may perform operation 516.

In operation 516, the AMF 502 may transmit the information regarding the location of the UE B 301 to the ProSe function 303.

In operation 518, the ProSe function 303 may determine whether to update inter-PLMN communication information for direct communication. For example, the ProSe function 303 may determine information (e.g., a frequency used in a corresponding area for direct communication, etc.) regarding a radio resource available at the location of the UE received in operation 516. Also, the ProSe function 303 may compare the information regarding the radio resource with information (e.g., frequency information transmitted by the ProSe function 303 to the ProSe function 206, etc.) regarding a radio resource previously determined by the ProSe function 303. If the information regarding the radio resource determined in operation 518 is different from the previously determined information regarding the radio resource, the ProSe function 303 may perform operation 520.

In operation, the ProSe function 303 may transmit a ProSe Provisioning Update Request message to the ProSe function 206 of the PLMN A. The ProSe Provisioning Update Request message may include updated information (e.g., frequency information, etc.) regarding a radio resource used by the UE B 301 for direct communication.

The ProSe function 206 that has received the ProSe Provisioning Update Request message may store the received information regarding the radio resource to be used by the UE B 301 for direct communication.

In operation 522, the ProSe function 206 may return a ProSe Provisioning Update Response message to the ProSe function 303 of the PLMN B.

In operation 524, the ProSe function 206 may transmit a ProSe Communication Update Request message to the UE A 201. The ProSe Communication Request message may include updated information regarding a radio resource available for or used by the UE B 301 for direct communication.

By using newly received information regarding the radio resource, the UE A 201 that has received the ProSe Communication Request message may receive data transmitted through the corresponding radio resource. Accordingly, the UE A 201 may receive data transmitted by the UE B 301 through the corresponding radio resource.

Embodiment 3

In Embodiment 3, a direct communication between subscriber UEs of different mobile network operators is described. According to an embodiment of the disclosure, for inter-PLMN communication, an interaction method between base stations and inter-PLMN communication information provided by a base station to a UE are described.

Figure 6:
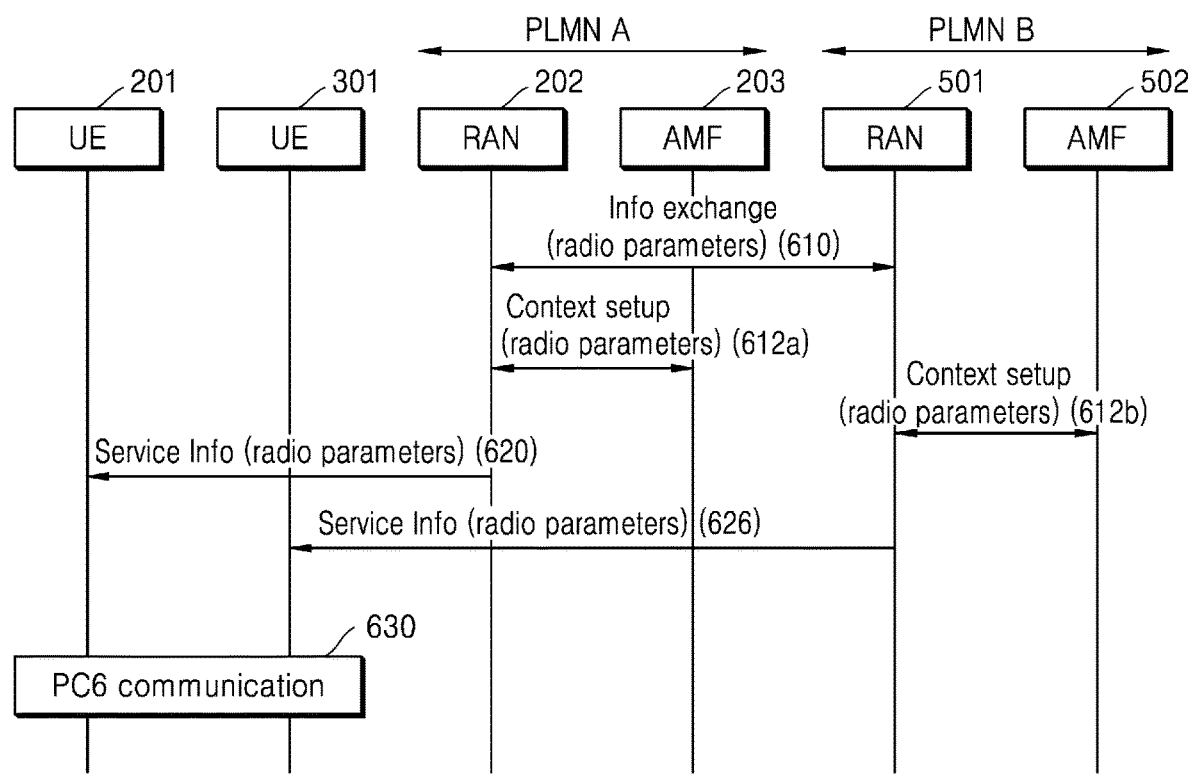
FIG. 6 illustrates a procedure in which a base station provides inter-PLMN communication information to a terminal, according to an embodiment of the disclosure.

FIG. 6 illustrates a procedure in which a base station provides inter-PLMN communication information to a UE, according to an embodiment of the disclosure.

Referring to FIG. 6, according to an embodiment of the disclosure, the UEs 201 and 301 may support direct communication. The UE A 201 is a UE subscribed to the mobile network operator PLMN A, and the UE B 301 is a UE subscribed to the mobile network operator PLMN B. The base station 202 of the PLMN A may support a direct communication function. The base station 501 of the PLMN B may support a direct communication function.

When the UE A 201 and the UE B 301 are UEs subscribed to different PLMNs, the UEs may use different radio resources (e.g., frequencies, etc.) for direct communication. Accordingly, in order for the UEs to perform direct communication, information regarding a radio resource available for or used by each UE needs to be identified. According to an embodiment of the disclosure, the base stations need to be able to obtain information regarding radio resources used by different PLMNs. For example, the base station may identify information regarding a radio resource used by another PLMN, by using pre-stored configuration information. Alternatively, the base station may perform operation 610 to obtain, from a base station of another PLMN, information regarding a radio resource used by the other PLMN. Alternatively, the base station may perform operation 612 to obtain, from the AMF, information regarding a radio resource used by another PLMN.

In operation 610, the base station 202 of the PLMN A and the base station 501 of the PLMN B located in adjacent areas may exchange service parameters for direct communication with each other. For example, the base station 202 of the PLMN A may provide, to the base station 501 of the PLMN B, information (e.g., frequency information, etc.) regarding a radio resource used by the PLMN A for direct communication. Also, the base station 501 of the PLMN B may provide, to the base station 202 of the PLMN A, information (e.g., frequency information, etc.) regarding a radio resource used by the PLMN B for direct communication.

Alternatively, the base station may transmit/receive service parameters for direct communication to/from the AMF connected to each base station. For example, the base station 202 of the PLMN A may obtain, from the AMF 203, the information (e.g., frequency information, etc.) regarding the radio resource used by the PLMN B for direct communication. Also, the base station 501 of the PLMN B may obtain, from the AMF 502, the information (e.g., frequency information, etc.) regarding the radio resource used by the PLMN A for direct communication.

The base stations 202 and 501 may obtain and store inter-PLMN communication information used by another PLMN for direct communication, based on configuration information, information received in operation 610, or information received in operation 612.

In operation 620, the base station 202 of the PLMN A may provide, to the UE A 201 subscribed to the PLMN A, inter-PLMN communication information (e.g., frequency information used by the PLMN B for direct communication, etc.). A message in operation 620 may be provided in a broadcast method (e.g., a system information block (SIB) message, etc.) or may be provided in a unicast method (e.g., a radio resource control (RRC) message, etc.).

In operation 630, the UE A 201 that has received the inter-PLMN communication information may initiate direct communication with the UE B 301. That is, the UE A 201 may receive data transmitted through a radio resource available for or used by the UE B 301 for direct communication.

In operation 626, the base station 501 of the PLMN B may provide, to the UE B 301 subscribed to the PLMN B, inter-PLMN communication information (e.g., frequency information used by the PLMN A for direct communication, etc.). A message in operation 626 may be provided in a broadcast method (e.g., an SIB message, etc.) or may be provided in a unicast method (e.g., an RRC message, etc.).

In operation 630, the UE B 301 that has received the inter-PLMN communication information may initiate direct communication with the UE A 201. That is, the UE B 301 may receive data transmitted through a radio resource available for or used by the UE A 201 for direct communication.

Figure 7:
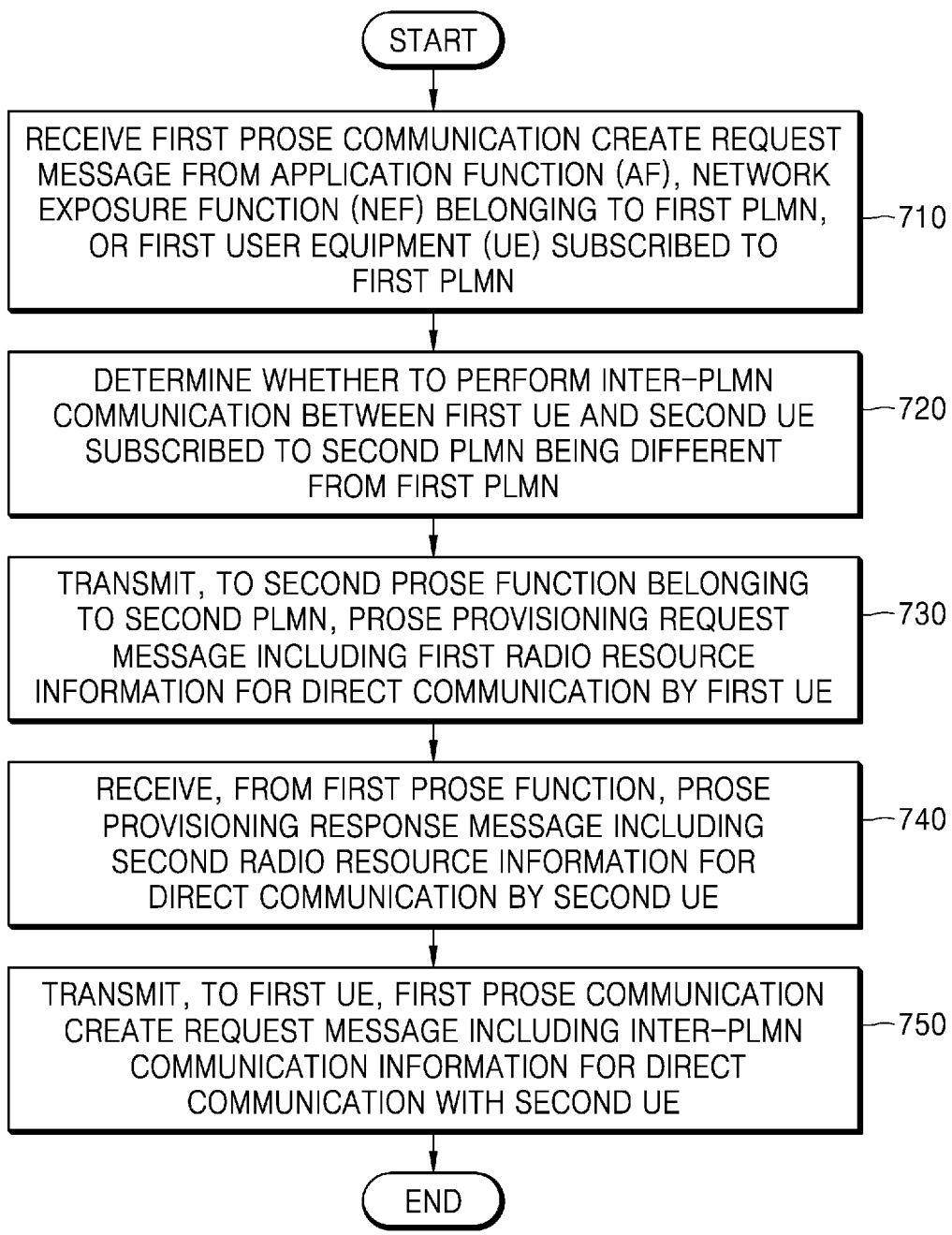
FIG. 7 is a flowchart illustrating an operating method of a first proximity-based services (ProSe) function, according to an embodiment of the disclosure.

FIG. 7 is a flowchart illustrating an operating method of a first ProSe function, according to an embodiment of the disclosure.

In this case, a first ProSe function indicates a ProSe function belonging to a first PLMN, and a second ProSe function indicates a ProSe function belonging to a second PLMN. In this regard, the first ProSe function may be a ProSe function capable of supporting an inter-PLMN or an inter-PLMN for each ProSe service.

In operation 710, the first ProSe function receives a first ProSe Communication Create Request message from an AF, an NEF belonging to the first PLMN, or a first UE subscribed to the first PLMN. Also, according to an embodiment, the ProSe Communication Create Request message may include service information including an ID of the first UE, an ID of a second UE, an HPLMN ID of the first UE, and an HPLMN ID of the second UE. In this case, the second UE may indicate a UE subscribed to the second PLMN that is different from the first PLMN.

In this regard, the NEF may transmit the first ProSe Communication Create Request message from the AF to the first ProSe function. For example, the NEF may store the service information in a UDR, and the UDR may transmit a notification message including the stored service information to the first ProSe function. Also, when the first ProSe function is a serving ProSe function of the first UE and the AF has identified information about the first ProSe function, the AF may directly transmit the ProSe Communication Create Request message to the first ProSe function. In addition, when the first UE determines to initiate direct communication, the first UE may transmit the ProSe Communication Create Request message to the first ProSe function.

In operation 720, the first ProSe function determines whether to perform inter-PLMN communication between the first UE and the second UE that is subscribed to the second PLMN different from the first PLMN. According to an embodiment, it may be determined whether to perform inter-PLMN communication between the first UE and the second UE, based on at least one of the service information, policy information, UE subscription information, and an SLA between PLMNs.

The first ProSe function that has received the service information may determine whether inter-PLMN communication is required, based on the service information included in the ProSe Communication Create Request message received in operation 710, a mobile network operator policy (e.g., ProSe policy), and UE subscription information. For example, the first ProSe function may determine that the second UE is not a UE subscribed to the first PLMN and/or may determine that the second UE is a UE subscribed to the second PLMN, based on the UE ID or the HPLMN ID of the second UE. Also, the first ProSe function may determine whether communication with the second ProSe function of the second PLMN is possible, based on the SLA between PLMNs.

In operation 730, the first ProSe function transmits, to the second ProSe function belonging to the second PLMN, a ProSe Provisioning Request message including first radio resource information for direct communication by the first UE. Then, in operation 740, the first ProSe function receives, from the second ProSe function, a ProSe Provisioning Response message including second radio resource information for direct communication by the second UE.

When the first UE and the second UE are UEs subscribed to different PLMNs, the corresponding UEs may be using or configured to use different radio resources (e.g., frequencies, etc.) for direct communication. Accordingly, in order for the UEs to perform direct communication, information regarding a radio resource being used or configured to be used by each UE needs to be identified. Therefore, the ProSe function needs to be able to obtain information regarding radio resources used by different PLMNs. Operations 730 and 740 are processes of obtaining information regarding radio resources used by different PLMNs.

Moreover, according to an embodiment, the first ProSe function may also identify information regarding a radio resource used by another PLMN, by using pre-stored configuration information. Alternatively, the first ProSe function may also obtain information regarding a radio resource used by another PLMN from an NF (e.g., a ProSe function) of the other PLMN.

In operation 750, the first ProSe function transmits, to the first UE, a first ProSe Communication Create Request message including inter-PLMN communication information for direct communication with the second UE. In this case, the inter-PLMN communication information may include the first radio resource information and the second radio resource information. The first UE that has received the inter-PLMN communication information for direct communication with the second UE through the first ProSe Communication Create Request message may perform direct communication with the second UE by using the first radio resource information and/or the second radio resource information included in the inter-PLMN communication information.

Although not shown in FIG. 7, the first ProSe function may receive a ProSe Service Request message from an AMF and transmit a ProSe Service Response message to the AMF during a UE registration process. According to an embodiment, the ProSe Service Request message may include an ID of the first UE, a ProSe authorized indication for the first UE, information regarding a ProSe service for which the first UE is authorized, etc. Also, the AMF may receive, from a UDM or a PCF, information indicating whether an inter-PLMN is supportable or information indicating whether an inter-PLMN for each ProSe service is supportable, and may select the first ProSe function based on the received information. When the AMF selects the first ProSe function, the AMF may transmit the ProSe Service Request message to the first ProSe function.

Also, according to an embodiment, the first ProSe function may receive information regarding a location of the first UE from the AMF. When the information regarding the location of the first UE changes, such as a case where the first UE moves, the first ProSe function may receive information regarding the changed location of the first UE from the AMF. The first ProSe function may determine whether to update the inter-PLMN communication information based on the information regarding the location of the first UE. That is, the first ProSe function may update the inter-PLMN communication information based on information regarding a radio resource available at the changed location of the first UE. In case that it is determined to update the inter-PLMN communication information, the first ProSe function may transmit, to the second ProSe function belonging to the second PLMN, a ProSe Provisioning Update Request message including updated first radio resource information, and may receive a ProSe Provisioning Update Response message from the second ProSe function. In this case, the ProSe Provisioning Update Response message may include updated second radio resource information. Then, the first ProSe function may transmit a ProSe Communication Update Request message including inter-PLMN communication information including the updated first radio resource information and the updated second radio resource information.

Figure 8:
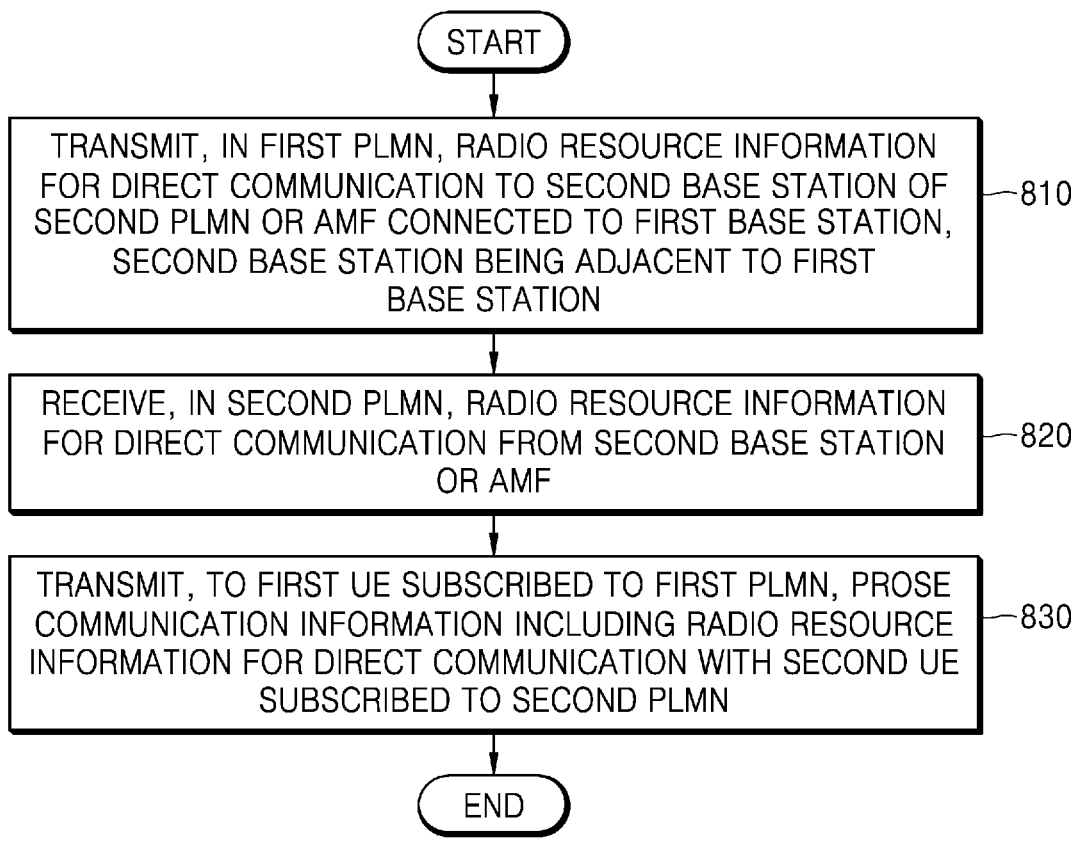
FIG. 8 is a flowchart illustrating an operating method of a first base station, according to an embodiment of the disclosure.

FIG. 8 is a flowchart illustrating an operating method of a first base station, according to an embodiment of the disclosure.

In this case, the first base station indicates a base station of the first PLMN, and a second base station indicates a base station of the second PLMN.

As described above, when the first UE and the second UE are UEs subscribed to different PLMNs, the corresponding UEs may be using or configured to use different radio resources (e.g., frequencies, etc.) for direct communication. Accordingly, in order for the UEs to perform direct communication, information regarding a radio resource being used or configured to be used by each UE needs to be identified. Therefore, the ProSe function needs to be able to obtain information regarding radio resources used by different PLMNs. In the case of the embodiment shown in FIG. 8, a process of receiving such information regarding radio resources from a base station is described.

In operation 810, the first base station transmits, in the first PLMN, information regarding a radio resource for direct communication to the second base station of the second PLMN or an AMF connected to the first base station, the second base station being adjacent to the first base station. Then, in operation 820, the first base station receives, in the second PLMN, information regarding a radio resource for direct communication from the second base station or the AMF. Operations 810 and 820 are processes of transmitting/receiving, by the first base station, service parameters for direct communication to/from the second base station or the AMF.

In operation 830, the first base station transmits, to the first UE subscribed to the first PLMN, ProSe communication information including information regarding a radio resource for direct communication with the second UE subscribed to the second PLMN. In this case, the ProSe communication information may be unicast (e.g., an RRC message, etc.) or broadcast (e.g., an SIB message, etc.).

Figure 9:
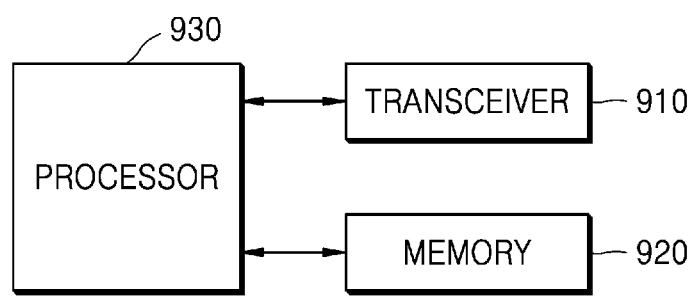
FIG. 9 is a diagram illustrating a configuration of a terminal, according to an embodiment of the disclosure.

FIG. 9 is a diagram illustrating a configuration of a UE, according to an embodiment of the disclosure.

As shown in FIG. 9, according to the disclosure, the UE may include a processor 930, a transceiver 910, and a memory 920. However, components of the UE are not limited to the aforementioned example. For example, the UE may include more components than the aforementioned components or may include fewer components than the aforementioned components. In addition, the processor 930, the transceiver 910, and the memory 920 may be implemented in a single chip.

The transceiver 910 may transmit or receive a signal to or from the base station. The signal transmitted to or received from the base station may include control information and data. The transceiver 910 may include an RF transmitter for up-converting a frequency of a signal to be transmitted and amplifying the signal and an RF receiver for low-noise amplifying a received signal and down-converting a frequency of the received signal. However, this is merely an embodiment of the transceiver 910, and components of the transceiver 910 are not limited to the RF transmitter and the RF receiver. Furthermore, the transceiver 910 may receive a signal through a radio channel, output the received signal to the processor 930, and transmit a signal output from the processor 930 through a radio channel.

According to an embodiment, the memory 920 may store a program and data necessary for operations of the UE. Also, the memory 920 may store control information or data included in a signal transmitted or received by the UE. The memory 920 may include a storage medium, such as read-only memory (ROM), random access memory (RAM), a hard disk, a compact disk (CD)-ROM, and a digital versatile disc (DVD), or a combination of storage media. Also, the memory 920 may include a plurality of memories. According to an embodiment, the memory 920 may store a program for performing direct communication according to the embodiments of the disclosure described above.

According to an embodiment, the processor 930 may control a series of processes for the UE to operate according to the embodiments of the disclosure described above. For example, the processor 930 may control the components of the UE to perform direct communication according to the embodiments of the disclosure. The processor 930 may include a plurality of processors, and the processor 930 may perform an operation for protecting information, according to the disclosure described above, by executing the program stored in the memory 920.

Figure 10:
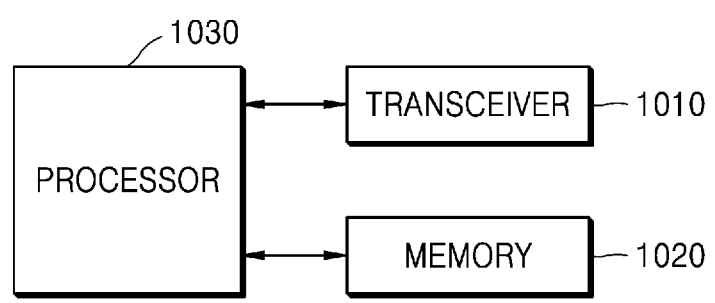
FIG. 10 is a diagram illustrating a configuration of a terminal, according to an embodiment of the disclosure.

FIG. 10 is a diagram illustrating a configuration of a UE, according to an embodiment of the disclosure.

Figure 11:
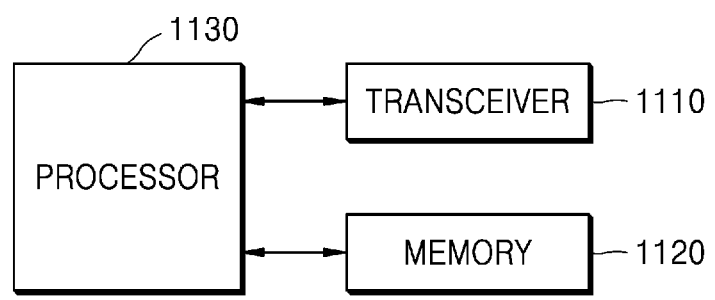
FIG. 11 is a diagram illustrating a configuration of a network entity, according to an embodiment of the disclosure.

As shown in FIG. 11, according to the disclosure, the base station may include a processor 1030, a transceiver 1010, and a memory 1020. However, components of the base station are not limited to the aforementioned example. For example, the base station may include more components than the aforementioned components or may include fewer components than the aforementioned components. In addition, the processor 1030, the transceiver 1010, and the memory 1020 may be implemented in a single chip.

The transceiver 1010 may transmit or receive a signal to or from the UE. The signal transmitted to or received from the UE may include control information and data. The transceiver 1010 may include an RF transmitter for up-converting a frequency of a signal to be transmitted and amplifying the signal and an RF receiver for low-noise amplifying a received signal and down-converting a frequency of the received signal. However, this is merely an embodiment of the transceiver 1010, and components of the transceiver 1010 are not limited to the RF transmitter and the RF receiver. Furthermore, the transceiver 1010 may receive a signal through a radio channel, output the received signal to the processor 1030, and transmit a signal output from the processor 1030 through a radio channel. The processor 1030 may include a plurality of processors, and the processor 1030 may enable direct communication to be performed in a wireless communication system, according to the disclosure described above, by executing the program stored in the memory 1020.

According to an embodiments, the memory 1020 may store a program and data necessary for operations of the base station. Also, the memory 1020 may store control information or data included in a signal transmitted or received by the base station. The memory 1020 may include a storage medium, such as ROM, RAM, a hard disk, a CD-ROM, and a DVD, or a combination of storage media. Also, the memory 1020 may include a plurality of memories. According to an embodiment, the memory 1020 may store a program for performing direct communication according to the embodiments of the disclosure described above.

The processor 1030 may control a series of processes for the base station to operate according to the embodiments of the disclosure described above. For example, the processor 1030 may control the components of the base station to perform direct communication according to embodiments of the disclosure.

FIG. 11 is a diagram illustrating a configuration of a network entity, according to an embodiment of the disclosure.

The term ' . . . er/or' or 'module' used below indicates a unit, which processes at least one function or operation, and may be implemented by hardware or software, or by a combination of hardware and software. For example, the network entity of FIG. 11 may include a ProSe function.

Referring to FIG. 11, the network entity may include a transceiver 1110, a memory 1120, and a processor 1130.

The transceiver 1110 may provide an interface for performing communication with other apparatuses in a network. That is, the transceiver 1110 converts a bit string transmitted from the network entity to another apparatus into a physical signal and coverts a physical signal received from another apparatus into a bit string. In other words, the transceiver 1110 may transmit or receive a signal. Accordingly, the transceiver 1110 may be referred to as a modem, a transmitter, a receiver, a communication unit, or a communication module. In this case, the transceiver 1110 enables the network entity to communicate with the other apparatuses through backhaul connection (e.g., wired backhaul or wireless backhaul) or another connection method.

The memory 1120 may store data, such as basic programs, application programs, and configuration information, for operations of the network entity. The memory 1120 may be configured in a volatile memory, a nonvolatile memory, or a combination of a volatile memory and a nonvolatile memory. In addition, the memory 1120 may provide the stored data upon a request by the processor 1130.

The processor 1130 may control overall operations of the network entity. For example, the processor 1130 may transmit or receive a signal through the transceiver 1110. Also, the processor 1130 may write and read data to and from the memory 1120. To this end, the processor 1130 may include at least one processor. The processor 1130 may control the network entity to perform operations according to various embodiments described above. For example, the processor 1130 may control the components of network entity to perform direct communication according to the embodiments of the disclosure.

The methods according to the embodiments described in the claims or the detailed description of the disclosure may be implemented in hardware, software, or a combination of hardware and software.

When implemented as software, a computer-readable storage medium or a computer program product which stores one or more programs (e.g., software modules) may be provided. The one or more programs, which are stored in the computer-readable storage medium or the computer program product, are configured for execution by one or more processors in an electronic device. The one or more programs may include instructions that cause the electronic device to execute the methods according to the claims of the disclosure or the embodiments described in the specification.

The programs (e.g., software modules or software) may be stored in RAM, non-volatile memory including flash memory, ROM, electrically erasable programmable read only memory (EEPROM), a magnetic disc storage device, a CD-ROM, a DVD, another optical storage device, or a magnetic cassette. Alternatively, the programs may be stored in a memory including any combination of some or all of the aforementioned memories. Also, each of the memories may include a plurality of memories.

In addition, the programs may be stored in an attachable storage device accessible through any or a combination of communication networks such as the Internet, an intranet, a local area network (LAN), a wide LAN (WLAN), or a storage area network (SAN). Such a storage device may access a device performing the embodiments of the disclosure through an external port. Furthermore, a separate storage device on the communication network may access the electronic device performing the embodiments of the disclosure.

In the aforementioned embodiments of the disclosure, components included in the disclosure are expressed in a singular or plural form according to specific embodiments. However, singular or plural expressions have been selected properly for a condition provided for convenience of description, and the disclosure is not limited to singular or plural components. Components expressed in the plural form may be configured as a single component, or a component expressed in the singular form may be configured as plural components.

Meanwhile, it should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be implemented in combination as necessary. For example, portions of an embodiment of the disclosure are combined with portions of another embodiment of the disclosure. Also, the embodiments of the disclosure may be applied to other systems (e.g., an LTE system, a 5G or NR system, etc.), and other modified examples based on the technical concept of the aforementioned embodiments may be implemented.

What is claimed is:

1. An operating method of a first core network entity corresponding to a first proximity-based services (ProSe) Function belonging to a first public land mobile network (PLMN), the operating method comprising:
    receiving a first ProSe Communication Create Request message from an application function (AF), a network exposure function (NEF) belonging to the first PLMN, or a first user equipment (UE) subscribed to the first PLMN;
    determining whether to perform inter-PLMN communication between the first UE and a second UE subscribed to a second PLMN, the second PLMN being different from the first PLMN;
    transmitting, to a second core network entity corresponding to a second ProSe function belonging to the second PLMN, a ProSe Provisioning Request message comprising first radio resource information for direct communication by the first UE;
    receiving, from the second core network entity corresponding to the second ProSe function, a ProSe Provisioning Response message comprising second radio resource information for direct communication by the second UE; and
    transmitting, to the first UE, the first ProSe Communication Create Request message comprising inter-PLMN communication direct information for communication with the second UE.

2. The operating method of claim 1, wherein the ProSe Communication Create Request message comprises service information comprising at least one of an Identifier (ID) of the first UE, an ID of the second UE, a home PLMN (HPLMN) ID of the first UE, and an HPLMN ID of the second UE.

3. The operating method of claim 2, wherein the determining of whether to perform inter-PLMN communication between the first UE and the second UE subscribed to the second PLMN being different from the first PLMN comprises determining whether to perform inter-PLMN communication between the first UE and the second UE based on at least one of the service information, policy information, UE subscription information, and a service level agreement (SLA) between PLMNs.

4. The operating method of claim 1, further comprising:
    receiving a ProSe Service Request message from an access and mobility management function (AMF); and
    transmitting a ProSe Service Response message to the AMF.

5. The operating method of claim 4, wherein the ProSe Service Request message comprises at least one of an ID of the first UE, a ProSe authorized indication for the first UE, and information regarding a ProSe service for which the first UE is authorized.

6. The operating method of claim 4, wherein the receiving of the ProSe Service Request message from the AMF comprises receiving the ProSe Service Request message based on information indicating whether an inter-PLMN is supportable or information indicating whether an inter- PLMN for each ProSe service is supportable, the information being received by the AMF from a unified data management (UDM) or a policy and charging function (PCF).

7. The operating method of claim 1, wherein the first ProSe function comprises a ProSe function capable of supporting an inter-PLMN or an inter-PLMN for each ProSe service.

8. The operating method of claim 1, wherein the inter-PLMN communication information comprises at least one of the first radio resource information and the second radio resource information.

9. The operating method of claim 1, further comprising:
receiving, from an AMF, location information regarding the first UE;
determining whether to update the inter-PLMN communication information, based on the location information regarding the first UE;
in case that it is determined to update the inter-PLMN communication information, transmitting, to the second core network entity corresponding to the second ProSe function belonging to the second PLMN, a ProSe Provisioning Update Request message comprising updated first radio resource information; and
receiving a ProSe Provisioning Update Response message from the second core network entity corresponding to the second ProSe function.

10. The operating method of claim 9,
wherein the ProSe Provisioning Update Response message comprises updated second radio resource information, and
wherein the operating method further comprises transmitting, to the first UE, a ProSe Communication Update Request message comprising the inter-PLMN communication information comprising at least one of the updated first radio resource information and the updated second radio resource information.

11. A first core network entity corresponding to a first proximity-based services (ProSe) function belonging to a first public land mobile network (PLMN), the first core network entity corresponding to the first ProSe function comprising:
a transceiver; and
at least one processor configured to:
receive a first ProSe Communication Create Request message from an application function (AF), a network exposure function (NEF) belonging to the first PLMN, or a user equipment (UE) subscribed to the first PLMN;
determine whether to perform inter-PLMN communication between the first UE and a second UE subscribed to a second PLMN, the second PLMN being different from the first PLMN;
transmit, to a second core network entity corresponding to a second ProSe function belonging to the second PLMN, a ProSe Provisioning Request message comprising first radio resource information for direct communication by the first UE;
receive, from the second core network entity corresponding to the second ProSe function, a ProSe Provisioning Response message comprising second radio resource information for direct communication by the second UE; and
transmit, to the first UE, the first ProSe Communication Create Request message comprising inter-PLMN communication information for direct communication with the second UE.

12. The first core network entity corresponding to the first ProSe function of claim 11, wherein the ProSe Communication Create Request message comprises service information comprising at least one of an Identifier (ID) of the first UE, an ID of the second UE, a home PLMN (HPLMN) ID of the first UE, and an HPLMN ID of the second UE.

13. The first core network entity corresponding to the first ProSe function of claim 12, wherein the processor is further configured to:
determine whether to perform inter-PLMN communication between the first UE and the second UE based on at least one of the service information, policy information, UE subscription information, and a service level agreement (SLA) between PLMNs.

14. The first core network entity corresponding to the first ProSe function of claim 11, wherein the processor is further configured to:
receive a ProSe Service Request message from an access and mobility management function (AMF); and
transmit a ProSe Service Response message to the AMF.

15. The first core network entity corresponding to the first ProSe function of claim 14, wherein the ProSe Service Request message comprises at least one of an ID of the first UE, a ProSe authorized indication for the first UE, and information regarding a ProSe service for which the first UE is authorized.

16. The first core network entity corresponding to the first ProSe function of claim 14, wherein the processor is further configured to:
receive the ProSe Service Request message based on information indicating whether an inter-PLMN is supportable or information indicating whether an inter-PLMN for each ProSe service is supportable, the information being received by the AMF from a unified data management (UDM) or a policy and charging function (PCF).

17. The first core network entity corresponding to the first ProSe function of claim 11, wherein the first ProSe function comprises a ProSe function capable of supporting an inter-PLMN or an inter-PLMN for each ProSe service.

18. The first core network entity corresponding to the first ProSe function of claim 11, wherein the inter-PLMN communication information comprises at least one of the first radio resource information and the second radio resource information.

19. The first core network entity corresponding to the first ProSe function of claim 11, wherein the processor is further configured to:
receive, from an AMF, location information regarding the first UE;
determine whether to update the inter-PLMN communication information, based on the location information regarding the first UE;
in case that it is determined to update the inter-PLMN communication information, transmit, to the second core network entity corresponding to the second ProSe function belonging to the second PLMN, a ProSe Provisioning Update Request message comprising updated first radio resource information; and
receive a ProSe Provisioning Update Response message from the second core network entity corresponding to the second ProSe function.

20. The first core network entity corresponding to the first ProSe function of claim 19,
wherein the ProSe Provisioning Update Response message comprises updated second radio resource information, and wherein the processor is further configured to:
  transmit, to the first UE, a ProSe Communication Update Request message comprising the inter-PLMN communication information comprising at least one of the updated first radio resource information and the updated second radio resource information.

* * * * *